(12) United States Patent
Tsunekawa et al.

(10) Patent No.: US 6,409,557 B1
(45) Date of Patent: Jun. 25, 2002

(54) EXHAUST ARRANGEMENT FOR OUTBOARD MOTOR

(75) Inventors: Hiroyuki Tsunekawa; Takahide Watanabe, both of Shizuoka (JP)

(73) Assignee: Sanshin Kogyo Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/303,066

(22) Filed: Apr. 30, 1999

(30) Foreign Application Priority Data

Apr. 30, 1998 (JP) ............................................. 10-119786

(51) Int. Cl.⁷ ............................................. B63H 21/10
(52) U.S. Cl. ............................................. 440/88; 440/89
(58) Field of Search ........................... 440/88, 89, 900; 123/196 R, 196 AB; 60/312, 314, 320, 321, 322

(56) References Cited

U.S. PATENT DOCUMENTS

| | | |
|---|---|---|
| 3,493,081 A | 2/1970 | Tado |
| 4,452,194 A | 6/1984 | Watanabe |
| 4,498,875 A | 2/1985 | Watanabe |
| 4,523,556 A | 6/1985 | Suzuki |
| 4,562,797 A | 1/1986 | Suzuki |
| 4,611,559 A | 9/1986 | Sumigawa |
| 4,709,671 A | 12/1987 | Sumigawa |
| 4,828,519 A | 5/1989 | Watanabe |
| 5,072,809 A | 12/1991 | Shibata |
| 5,118,316 A | 6/1992 | Kakizaki et al. |
| 5,215,164 A | 6/1993 | Shibata |
| 5,232,387 A | 8/1993 | Sumigawa |
| 5,439,404 A | 8/1995 | Sumigawa |
| 5,462,464 A | 10/1995 | Ming |
| 5,487,687 A | 1/1996 | Idzikowski et al. |
| 5,487,688 A | 1/1996 | Sumigawa |
| 5,501,624 A | 3/1996 | Matsumoto et al. |
| 5,704,819 A | 1/1998 | Isogawa |
| 5,733,157 A | 3/1998 | Okuzawa et al. |
| 5,752,866 A | 5/1998 | Takahashi et al. |
| 5,769,038 A | 6/1998 | Takahashi et al. |
| 5,778,848 A | 7/1998 | Takahashi et al. |
| 5,876,188 A | 3/1999 | Okamoto |
| 5,876,256 A | 3/1999 | Takahashi et al. |
| 5,893,783 A * | 4/1999 | Hiraoka et al. ................ 440/88 |
| 5,921,829 A | 7/1999 | Iwata |
| 5,924,901 A * | 7/1999 | Takahashi et al. ............. 440/88 |
| 5,934,957 A * | 8/1999 | Sato et al. ..................... 440/88 |
| 5,934,960 A | 8/1999 | Katayama et al. |
| 5,937,801 A * | 8/1999 | Davis ....................... 123/41.33 |
| 6,012,956 A | 1/2000 | Mishima et al. |
| 6,027,385 A | 2/2000 | Katayama et al. |
| 6,039,618 A | 3/2000 | Hiraoka et al. |
| 6,082,343 A | 6/2000 | Oishi et al. |
| 6,126,499 A | 10/2000 | Katayama et al. |

OTHER PUBLICATIONS

Existing Application entitled, Outboard Motor Cooling System, Application No. 09/440,777 filed on Nov. 16, 1999.

* cited by examiner

*Primary Examiner*—S. Joseph Morano
*Assistant Examiner*—Ajay Vasudeva
(74) *Attorney, Agent, or Firm*—Knobbe, Martens, Olson & Bear, LLP (57) ABSTRACT

An outboard motor includes an improved arrangement for an exhaust system, in association with a lubricant tank and a cooling system, for a four-cycle internal combustion engine that powers the outboard motor. The cooling system discharges coolant independent of an exhaust pipe and an expansion chamber of the exhaust system so as to inhibit an influx of coolant into the engine should the engine become temporarily disabled. In addition, the cooling system provides a pool or bath of coolant between the exhaust pipe and the lubricant tank to inhibit excessive heating of these components during normal and abnormal running conditions (i.e., if the engine becomes disabled).

71 Claims, 4 Drawing Sheets

EXHAUST ARRANGEMENT FOR OUTBOARD MOTOR

BACKGROUND OF THE INVENTION

1. Field of the Invention

This invention relates to an outboard motor and more particularly to an improved exhaust arrangement for outboard motors having four-cycle internal combustion engines.

2. Description of Related Art

An outboard motor, because of its compact nature, generally employs an exhaust system that includes an expansion chamber in the drive shaft housing and exhausts through a submerged discharge port. The expansion chamber performs the function of assisting and silencing the exhaust gases, as does the underwater exhaust gas discharge.

Outboard motors often also include an above water, idle exhaust gas discharge through which exhaust gases are expelled under idle and low speed running conditions. The idle exhaust gas discharge reduces back pressure in the exhaust system when the engine is running at low speeds and the associated watercraft is not planing.

A renewed interest in employing four-cycle engines as the power plants in outboard motors has recently arisen in order to address environmental concerns. A four-cycle engine, unlike a two-cycle engine though, requires a source of lubricant to hold the lubricant that has recirculated through the engine for lubricating purposes. In order to provide adequate storage capacity and to maintain a low profile for the outboard motor, the lubricant tank is generally positioned in the drive shaft housing below the engine. This positioning for the lubricant tank exposes it to the exhaust gases and thus presents a problem of heating the lubricant in the lubricant tank.

Outboard motors also conventionally employ an open-loop cooling system that draws cooling water from the body of water in which the outboard motor is operated (e.g., a lake or an ocean). The cooling water often is introduced into the exhaust system in order to cool the exhaust gases and the exhaust system, and to silence exhaust gases. The exhaust system thence returns the cooling water to the body of water.

If the engine temporarily becomes disabled, the pressure within the engine cylinder(s) can become less than the pressure within the exhaust system, and the resulting negative pressure differential may be sufficient to draw the introduced cooling water into the engine cylinder(s). Water invasion inside the engine can cause corrosion and damage the intake and exhaust valves of the four-cycle engine. In addition, because the supply of cooling water may temporarily stop, the temperature of the exhaust system can increase and consequently damage the exhaust system and surrounding components.

SUMMARY OF THE INVENTION

An aspect of the present invention involves an improved exhaust and cooling system arrangement for an outboard motor that adequately cools the exhaust system proximate to the lubricant tank during normal running conditions (both at high and low speeds), as well as continues to cool a portion of the exhaust system in proximity to the lubricant tank if the engine becomes disabled. The exhaust and cooling systems also are arranged to inhibit an influx of coolant into the engine through the exhaust system if the engine becomes temporarily disabled.

The outboard motor comprises a power head and a drive shaft housing depending from the power head. The power head contains a four-cycle, internal combustion engine that includes at least one coolant passage. A cooling system runs coolant through the coolant passage. An expansion chamber is located in the drive shaft housing, and an exhaust pipe depends below the engine and communicates with the expansion chamber to deliver exhaust gases to the expansion chamber. A lubricant tank for the engine is disposed in the drive shaft housing above the expansion chamber and in proximity to the exhaust pipe. A collection space is formed between at least a portion of the exhaust pipe and a portion of the lubricant tank. The collection space communicates with the cooling system such that coolant fills at least a portion of the collection space.

Further aspects, features, and advantages of the present invention will become apparent from the detailed description of the preferred embodiment which follow.

BRIEF DESCRIPTION OF THE DRAWINGS

The above-mentioned and other features of the invention will now be described with reference to the drawings of preferred embodiments of the present watercraft. The illustrated embodiments are intended to illustrate, but not to limit the invention. The drawings contain the following figures.

DETAILED DESCRIPTION OF THE PREFERRED EMBODIMENT

Figure 1:
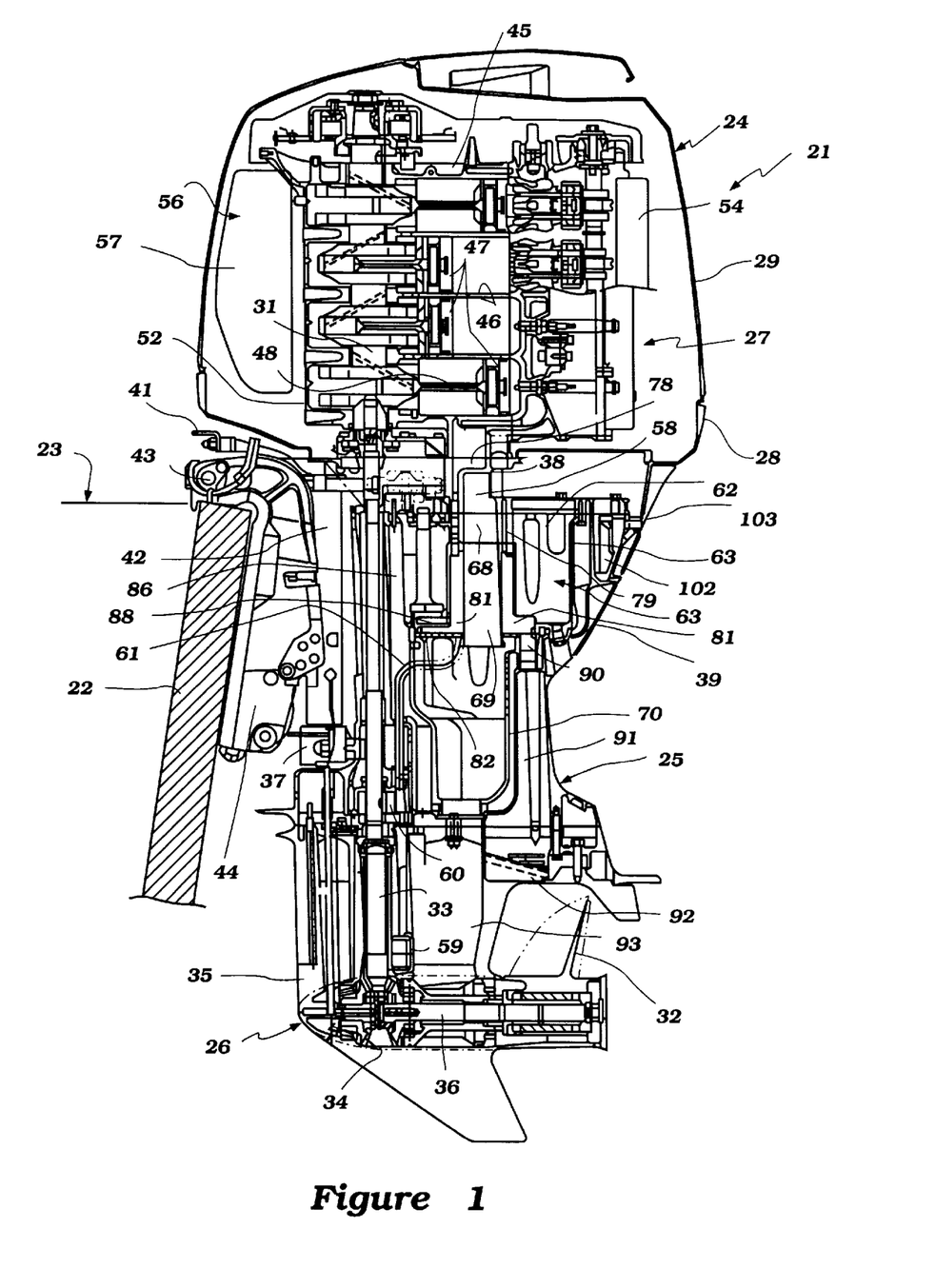
FIG. 1 is a side elevational view of an outboard motor that is shown in primarily cross-section and as attached to the transom of an associated watercraft, and that includes an exhaust system configured in accordance with a preferred embodiment of the present invention.

With reference now in detail to the drawings and initially to FIG. 1, an outboard motor is identified generally by the reference numeral 21. The outboard motor 21 is depicted as attached to a transom 22 of a watercraft which is shown partially and identified by the reference numeral 23.

The outboard motor 21 is comprised of a powerhead, indicated generally by the reference numeral 24; a drive shaft housing assembly, which depends from the powerhead 24 and which is identified generally by the reference numeral 25, and a lower unit, positioned at the lower end of the drive shaft housing 25 and indicated generally by the reference numeral 26.

The powerhead 24 contains a powering internal combustion engine 27 that is surrounded by a protective cowling that is comprised of a lower tray 28 and an upper main cowling member 29 that is detachably connected to the tray 28 in a suitable manner. As will become apparent and as is typical with outboard motor practice, the engine 27 is positioned in the powerhead 24 so that its crankshaft 31 rotates about a vertically extending axis. This is done so as to facilitate coupling of the crankshaft 31 to a transmission that is contained primarily within the drive shaft housing 25 and lower unit 26 for driving a propulsion device provided within the lower unit 26. In the illustrated embodiment, this propulsion device is comprised of a propeller 32.

The transmission is comprised primarily of drive shaft 33 that has a splined connection at its upper end to the crankshaft 31. A bevel gear is carried on the lower end of the drive shaft 33 and drives a conventional bevel gear reversing transmission 34 that is contained within a transmission cavity of the housing 35 of the lower unit 26. This transmission selectively drives a propeller shaft 35 in forward or reserve directions. The propeller 32 is affixed to the propeller shaft 35.

A steering shaft (not shown) is affixed to the drive shaft housing assembly 25 by means including a lower bracket 37. The upper end of this steering shaft is connected to an exhaust guide, indicated generally by the reference numeral 38 and upon which the engine 27 is supported at the upper end of an outer housing 39 of the drive shaft housing assembly 25. This steering shaft has a tiller 42 affixed to it so as to steer the outboard motor 21 about a vertically extending axis defined by a swivel bracket 42 in which the steering shaft is journaled.

The swivel bracket 42 is, in turn, connected by means of a pivot pin 43 to a clamping bracket 44. Pivotal movement about the pivot pin 43 permits tilt and trim movement of the outboard motor 21 as well as tilting of the outboard motor 21 to an out of the water position, as is well known in this art. The clamping bracket 44 is suitably, detachably affixed to the watercraft transom 22.

The internal combustion engine 27 that forms the prime mover for the powerhead 24 will now be described. In the illustrated embodiment, the engine 27 is of the four-cylinder, inline type and operates on a four-stroke principal. Although the number of cylinders and cylinder orientation can be varied without departing from the invention, the invention does have particular utility in conjunction with four-cycle engines. This is because four-cycle engines normally have an lubricant tank that contains a fairly substantial volume of lubricant that is recirculated and which must be maintained at not too high a temperature. Of course, the invention can also be employed with two-cycle engines which incorporate lubricant tanks in the assembly of the outboard motor.

The engine 27 includes a cylinder block 45 in which four vertically spaced, horizontally extending cylinder bores 46 are formed. Pistons 47 are slidably supported within these cylinder bores 46 and are connected to the small ends of connecting rods 48 in a known manner. The big ends of the connecting rods are journaled on the throws 49 of the crankshaft 31. The crankshaft 31 is rotatably journaled within a crankcase chamber formed by a crankcase member 52 and a skirt portion of the cylinder block 45 to which the crankcase member 52 is affixed in any suitable manner.

A cylinder head assembly, indicated generally by the reference numeral 54 is affixed to the end of the cylinder block 45 opposite to the crankcase member 52. The cylinder head assembly 54 has individual recesses formed in its lower face each of which cooperates with a respective one of the cylinder bores 46 and the heads of the piston 47 to form the combustion chambers of the engine.

An induction system, indicated generally by the reference numeral 56 supplies a charge to these combustion chambers. This induction system 56 includes an air inlet device and silencer 57 which is mounted in the powerhead 24 at the forward end of the main cowling member 29 and in spaced relationship to a vertically extending, forward face 58 of the crankcase member 52. The air inlet and silencer device 57 draws atmospheric air from within the protective cowling 29. This air is admitted through a rearwardly facing air inlet opening 59 formed in the main cowling member 29.

A plurality of intake pipes extend from the air inlet device 57 to individual throttle bodies. These throttle bodies include flow controlling throttle valves for controlling the speed of the engine 27 in a manner well known in the art. These throttle bodies each cooperate with a respective intake manifold runner that serves a cylinder head intake passage.

An intake valve arrangement is mounted in the cylinder head assembly 54 and is operated by an intake camshaft arrangement for opening and controlling the admission of a charge to the combustion chamber recesses from the cylinder head intake passages. The intake camshaft is driven at one-half crankshaft speed by any suitable timing drive.

Spark plugs (not shown) are mounted in the cylinder head assembly 54 and fire a charge that is delivered to the combustion chambers. These spark plugs are fired by a suitable ignition system. In addition to the air charge which has been delivered, fuel may be added to the combustion chambers either by means of carburetors, manifold injectors are direct cylinder injectors to form the fuel air mixture that is fired by the spark plugs. Since this charge forming system forms no part of the invention, further description of it is not believed to be necessary to permit those skilled in the art to practice the invention.

The charge which has been burned in the engine combustion chambers is discharged therefrom through an exhaust passage arrangement formed in the cylinder head assembly 54 on the side opposite the intake passage arrangement. An exhaust valve assembly, which is operated by an exhaust camshaft, is provided for controlling the communication of the combustion chambers with this exhaust passage arrangement. Like the intake camshaft, the exhaust camshaft is driven by a suitable timing mechanism at one-half crankshaft speed.

The cylinder head exhaust passage arrangement has a reentrant or U-shape and discharges into manifold runners that are formed integrally within the cylinder block 46 in a face that mates with the cylinder head assembly 54. These runners serve an exhaust manifold that extends vertically through the side of the cylinder block 53 and which terminates in a downwardly facing exhaust discharge passage.

Figure 4:
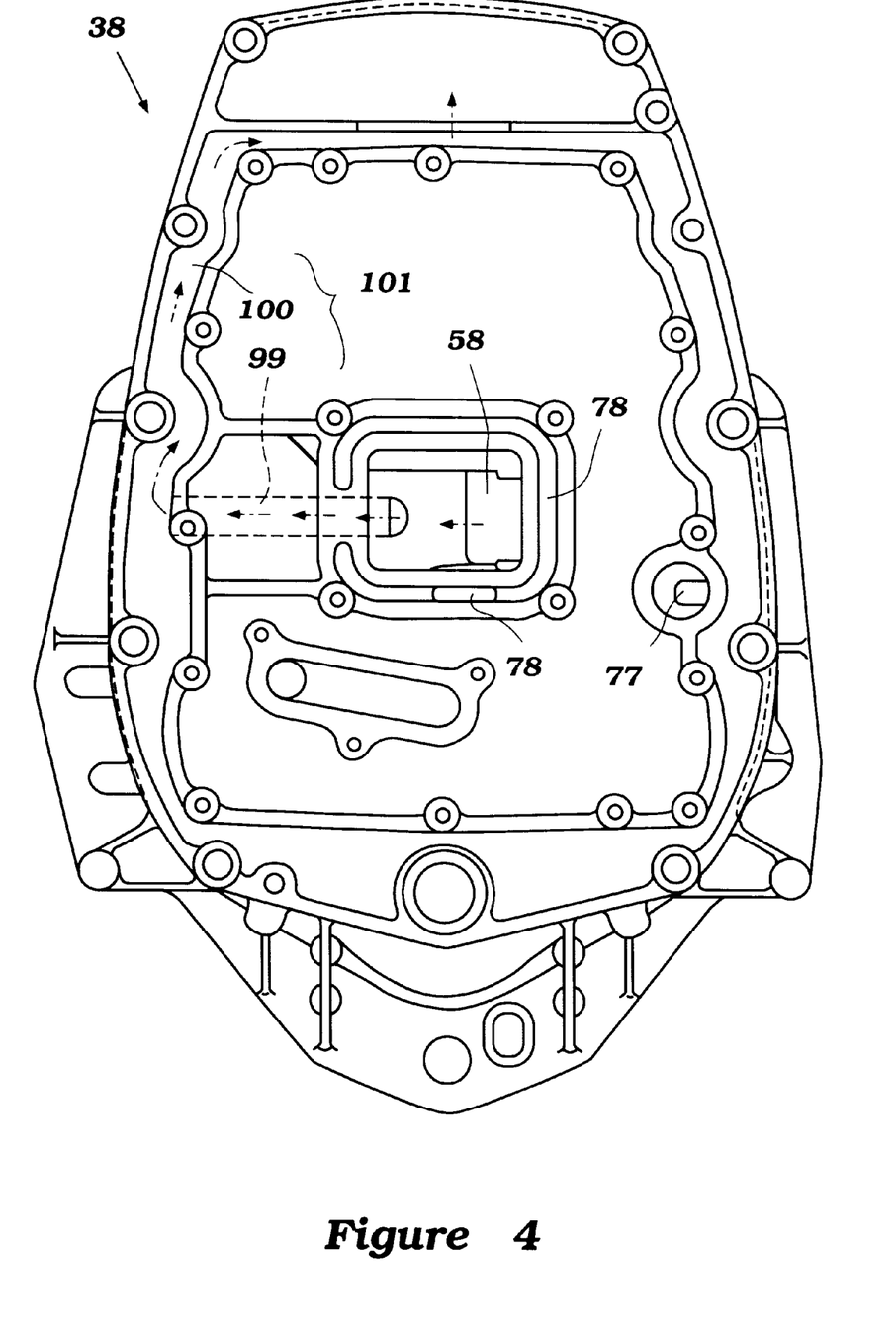
FIG. 4 is a bottom plan view of the exhaust guide for the engine.

This exhaust discharge passage communicates with an exhaust passage formed in the exhaust guide plate 38, one form of which appears in the embodiment of FIG. 4 and which is indicated by the reference numeral 58. This exhaust guide passage 58 communicates with an exhaust system for discharging the exhaust gases from the engine 27 to the atmosphere.

As is typical with outboard motor practice, the engine 27 is water cooled. To this end, the cylinder block 53 is provided with a cooling jacket. In a similar manner, the cylinder head 54 is provided with a cooling jacket. The cylinder block cooling jacket and the cylinder head cooling jacket are in communication with each other in any suitable manner.

Water for cooling the engine 27 is taken from the body of water in which the watercraft 23 is operating through an underwater coolant inlet opening 59 formed in the lower unit housing 35. This water is drawn by a water pump 60 that is directly driven off of the drive shaft 33 at the interface between the housing 39 of the drive shaft housing assembly 25 and the housing 35 of the lower unit 26. This water is then delivered upwardly toward the engine 27 through a supply conduit 61.

The structure of the outboard motor 21 as thus far described may generally be assumed to be conventional. Therefore, where any components of the engine 27 or of the outboard motor 21 and its propulsion system have not been described, resort may be had to any conventional structure with which to practice the invention.

An aspect of the invention deals with the relationship between the exhaust system, the cooling system, and a lubricant pan member for the engine 27, the lubricant reservoir or tank of which is indicated by the reference numeral 62. Basically, the lubricant reservoir 62 is formed by a lubricant pan member 63 that is affixed to the underside of the exhaust guide 38 by means of threaded fasteners.

Figure 2:
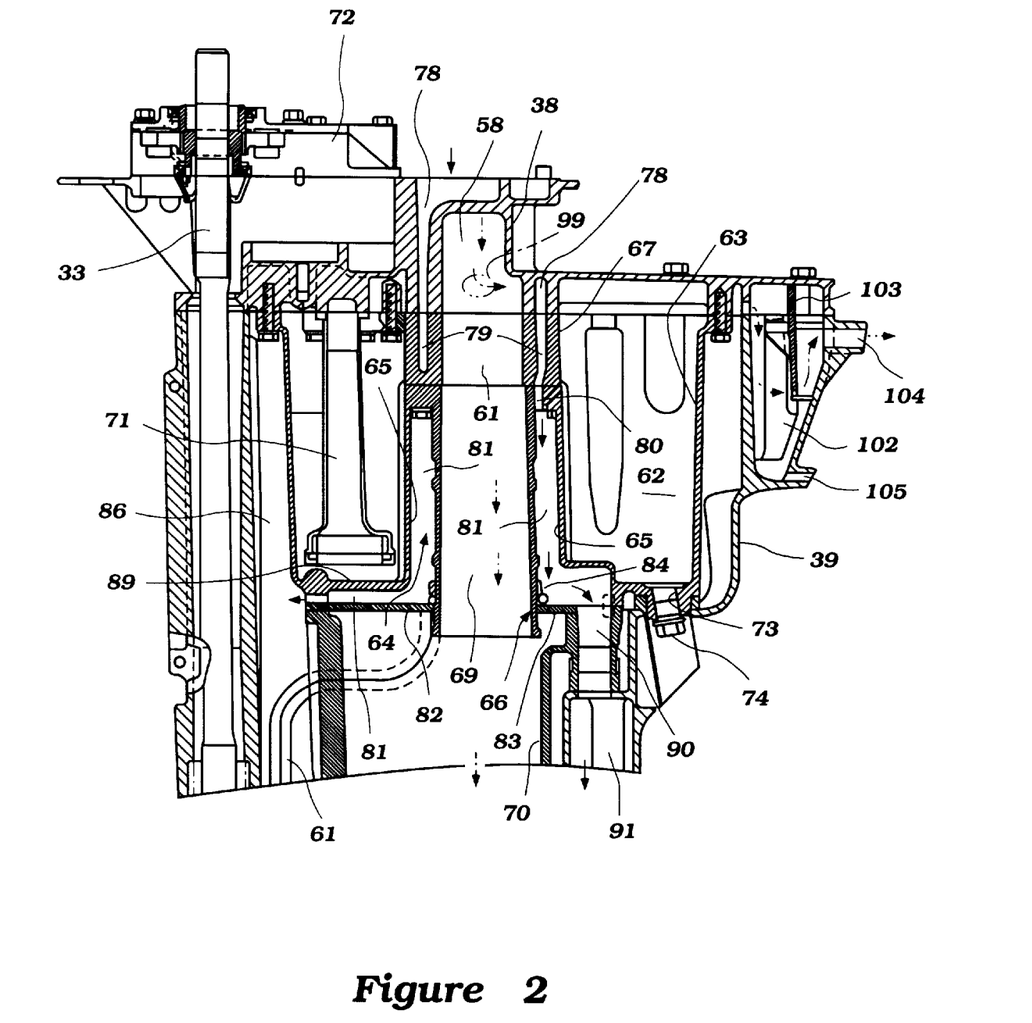
FIG. 2 is an enlarged cross-sectional view of a portion of the exhaust system of FIG. 1 arranged at an upper portion of a drive shaft housing and through an engine exhaust guide.
Figure 3:
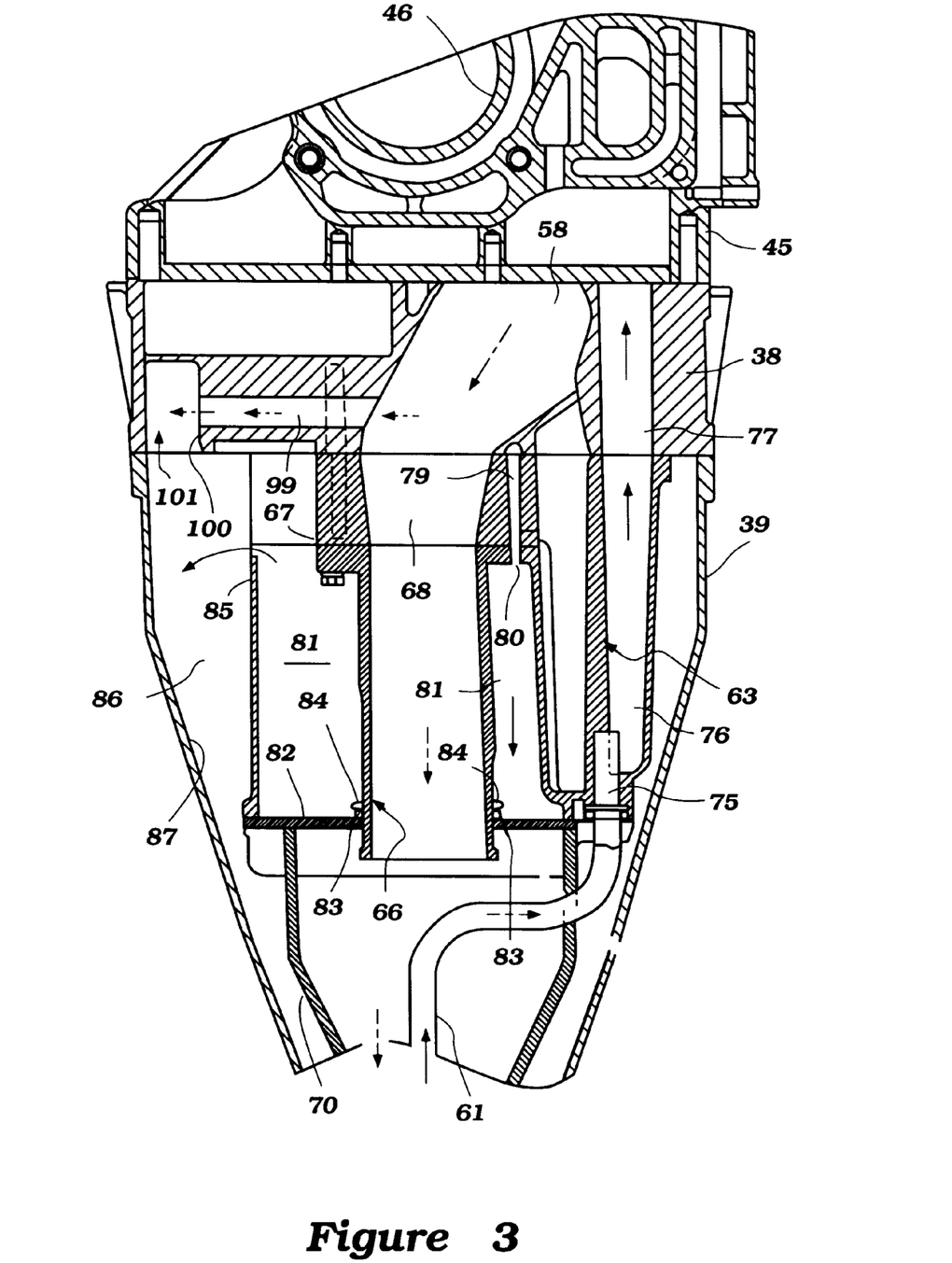
FIG. 3 is a cross-sectional view taken along the line 3—3 of FIG. 2.

With reference now to FIGS. 1–3, the lubricant pan member 63 defines a cavity or open area 64 by means of an inner surface 65. An exhaust pipe 66 is affixed via a spacer member 67 to the underside of the exhaust guide 38 in open communication with the exhaust discharge opening 58. The spacer member 67 has a complimentary exhaust receiving opening or passage 68 that receives the exhaust gases from the exhaust guide plate discharge opening 58 and transfers them to a like opening 69 formed in the exhaust pipe 66. The spacer member 67 can be unitarily formed with the lubricant pan member 63 or can be separately formed with the lubrication pan member attached thereto by a plurality of fasteners, as appreciated from FIG. 2.

The exhaust gases thence are delivered downwardly to a first expansion chamber or muffler 70. The expansion chamber is supported within the drive shaft housing 39 at a position below the lubricant tank 62, and in the illustrated embodiment, below the lubricant pan member 63. The expansion chamber 70 desirably is attached to a lower end of the lubricant pan member 63 by a plurality of fasteners and depends downwardly from the lubricant pan member 63.

As may be best seen in FIG. 2, a lower portion of the lubricant tank 62 is configured to pool lubricant. A pickup tube 71 depends into the lower portion of the lubricant tank 62 and is connected at its upper end to a passage in the exhaust guide 39 that communicates with an lubricant pump 72 for delivery of the lubricant (e.g., oil) to the engine lubricating system. Lubricant is returned to the lubricant tank 62 through a suitable drain arrangement.

As also best seen in FIG. 2, the lubricant pan member 63 has a discharge nipple 73 that is positioned in proximity to the drive shaft housing 39 and which has a drain plug 74 so that the lubricant can be removed from the outboard motor from externally of the drive shaft housing assembly 25 without removal of the engine 27.

As best seen in FIG. 3, the coolant conduit 61 terminates in a fitting 75 formed in the lower portion of the lubricant pan member 63 which defines a water delivery cavity 76 that extends along one peripheral wall of the lubricant pan member 63 in heat exchanging registry with the lubricant tank 62 so as to assist in cooling the lubricant contained therein. This coolant flows upwardly through a delivery passage 77 in the exhaust guide 38 for delivery to the engine cooling jackets described above.

As best seen in FIGS. 2 and 3, the exhaust guide 38 and the exhaust spacer 67 are formed with cooling jackets 78, 79 which encircles the exhaust passages 58, 68 of the exhaust guide 38 and the exhaust spacer 67, respectively. Water is delivered to this cooling jackets 78, 79 after it has circulated through the engine cooling jackets, respectively. Some or all of the cooling water delivered to the jackets 78, 79, however, can be provided independent of the engine cooling jackets. In addition, not all of the engine coolant, need be returned in this area.

The water from the cooling jackets 78, 79 of the exhaust guide 38 and spacer 67 is delivered to an opening which is formed between an upper end of the exhaust pipe 66 and the inner wall 65 of the lubricant pan member 63, and which encircles at least part of the upper end of the exhaust pipe 66. This opening 80 opens into a collection space 81.

The collection space 81 is defined within the open area 64 and between the exterior of the exhaust pipe 66 and the inner wall 65 of the lubricant pan member 63. The upper end of the collection space 81 is principally closed by a mounting flange of the exhaust pipe 66, which is attached to a lower side of the exhaust spacer 67. The lower side of the collection space 81 is closed by a closure plate 82.

The closure plate 82 extends across the lower end of the lubricant pan member 83 and over an upper end of the expansion chamber 70. In the illustrated embodiment, the closure plate is interposed between the lower end of the lubrication pan member 83 and an upper end of the expansion chamber 70 to separate the collection space 81 from the space within the expansion chamber 70.

As best seen in FIGS. 2 and 3, the exhaust pipe 66 extends through the closure plate 82 and terminates at a point within the expansion chamber 77. For this purpose, the closure plate 82 includes an opening through which the exhaust pipe 66 passes. A seal assembly seals the opening between the closure plate 82 and the exhaust pipe 66. In the illustrated embodiment, the seal assembly is formed by an annular gasket 83 that surrounds the exterior wall of the exhaust pipe 66. The gasket 83 is compressed between the closure plate 82 and a flange 84 formed on the exterior wall of the exhaust pipe 66 when these components are assembled. The seal inhibits cooling water in the collection area 81 from entering the expansion chamber 70.

The collection space 81 is also formed in part by an upstanding wall 85 the extends above the closure plate 82, as best seen in FIG. 3. In the illustrated embodiment, the upstanding wall 85 is integrally formed with the lubricant tank 62 as part of the lubricant pan member 63; however, the wall can be assembled with the lubricant pan member 63. The upper edge of the wall terminates short of the exhaust guide 38 and the spacer member 67 to form a spillover gap.

The spillover gap communicates with a spillover pathway that communicates with the exhaust system at a point below the expansion chamber 70. The spillover pathway is formed in part by a dividing wall 86 that extends between an inner wall 87 of the drive shaft housing 39 and the lubricant pan member 63, and also between the drive shaft housing inner wall 87 and the expansion chamber 70. As appreciated from FIGS. 2 and 3 together, the dividing wall 86, the upstanding wall 85 of the lubricant pan member 63, the inner wall 67 of the drive shaft housing 39 and the expansion chamber 70 together define the spillover pathway, at least in part.

The collection space 81 communicates with the spillover pathway through a first effluent opening 88 in addition to communicating with the spillover pathway through the spillover gap. In the illustrated embodiment the first effluent opening 88 is located through the upstanding wall 85 just above the closure plate 82 at the lower end of the collection space 81. In this manner, a portion of the wall pool within the collection space 81 flows beneath a lower wall 89 as the water drains through the first effluent opening 88 and into the spillover pathway.

The collection space also communicates with a larger second effluent opening 90 formed as part of the expansion chamber casing. The bulk of the cooling water is returned to the body of water in which the watercraft is operating through the second effluent opening that communicates with a vertically extending water discharge channel 91 formed at the back of the drive shaft housing. As seen best in FIG. 1, a water drain opening 92 is formed in the outer housing member 39 at a relatively low position from which this engine coolant can drain back into the body of water in which the watercraft is operating.

As seen in FIG. 1, the expansion chamber 70 communicates with an exhaust passage 93 formed in the lower unit 35 and which communicates with an underwater exhaust discharge formed in the hub of the propeller 32 for high speed underwater discharge of the exhaust gases. Thus, the combination of the expansion chamber 70, the lower unit exhaust passage 93 and the underwater exhaust gas discharge provide efficient silencing of the exhaust gases when traveling at higher speeds.

Although the portion of the exhaust system as thus far described provides good silencing when operating under a high speed running conditions, when the watercraft is traveling at slower speeds and is not in a planing condition, or when operating at idle, the through-the-hub underwater exhaust gas discharge will be too deeply submerged for the exhaust gases to exit this path. Also, under this condition, the exhaust gas pressure is lower and thus, this exhaust path cannot be employed.

Although above the water exhaust gas discharges are common with outboard motors, when utilized with four-cycle engines that have lubricant tanks in the drive shaft housing, there is a risk that the idle exhaust gases may come in contact with the lubricant tank and heat it. Also, when water is used to cool the exhaust pipe, there is a risk that this water may enter the engine through the exhaust system, particularly if the water discharged from the exhaust cooling jacket is in proximity to the idle exhaust gas discharge.

As best seen in FIGS. 2 and 3, the exhaust guide 38 is provided with an idle exhaust gas passage 99 which communicates directly with its exhaust passage 58 and above the passage 68 in the exhaust spacer 67.

From the passage 99, the idle exhaust gases pass into a groove 100 formed on an underside of the exhaust guide 38. The groove 100 forms a portion of a longitudinally extending, idle exhaust passage 101.

The exhaust gases then flow rearwardly as seen in FIGS. 1 and 2 to an expansion chamber 102 formed at the back of the drive shaft housing member 39. This expansion chamber 102 has a further baffle plate 103 across which the exhaust gases must pass before they can exit to the atmosphere through an above-the-water idle exhaust gas discharge port 104 formed in the drive shaft housing member 39.

A small water drain 105 is positioned at the lower portion of the expansion chamber 102 so as to permit any accumulated water in the exhaust gases to be separated and drained from the expansion chamber 102.

In operation, the coolant pump 60 draws cooling water through the water inlet 59 located on the lower unit housing 35. The pump 60 delivers water to the engine 27 through the delivery line 69, the coolant jacket 76 of the lubricant pan member 63, and the coolant passage 77 of the exhaust guide 38. From the cooling jackets of the engine 27, the coolant flows through the jackets 78, 79 of the exhaust guide 38 and the exhaust spacer member 67, and drains into the collection space 81 through the passage 80. The coolant pools within the collection space 81 under at least some running condition before it drains back to the body of water, either through the discharge channel 91 or through the spillover pathway.

The exhaust gases also flow from the engine 27, through the exhaust passage 58 of the exhaust guide 38, and through the passage 68 of the spacer member 67. The exhaust gases thence flow through the exhaust pipe 66 and into the expansion chamber 67. The exhaust gases are silenced within the expansion chamber 70 due at least in part to the increased flow area provided by the expansion chamber 70. The exhaust gases pass through the exhaust passage 93 in the lower unit housing 35 and are discharged through the propeller hub.

A small amount of coolant (e.g., less than a quarter of the coolant flow from the collection space 81) is introduced into the exhaust stream at a point below the exhaust pipe 66 and the expansion chamber 70 for additional silencing of the exhaust gases. This location, as well as the reduced volume, substantially lessen the possibility of water being drawn into the engine 27 should the engine 27 temporarily become disabled. In addition, the cooling water, which flows through the first effluent opening 81, flows over the exterior of the expansion chamber 70 and inner wall 87 of the drive shaft housing 35 and washes dirt and debris from these surfaces during use in order to inhibit corrosion of these components. The spillover gap also serves this purpose, and provides a relief should the coolant flow into the collection area 81 exceed the effluent flow of coolant therefrom, such as, for example, if one of the effluent openings 88, 90 becomes blocked.

The resulting pool of coolant in the collection area 81 lies in heat exchanging registry with the exhaust pipe 66 and with the lubricant tank 62. The coolant pool continues to cool these components even if the engine 27 should become temporarily disabled. In addition, the presence of the coolant pool between the exhaust pipe 66 and the lubricant tank 62 generally thermally isolates the lubricant tank 62 from the heat effect of the exhaust pipe 66. The exhaust pipe 66 in essence lies submerged within a bath of coolant to reduce heating the lubricant within the lubricant tank 62. Lubricant life improves and the components are less susceptible to heat damage as a consequence of the present arrangement between the exhaust system, the cooling system and the lubricant tank.

Although this invention has been described in terms of a certain preferred embodiment, other embodiments apparent to those of ordinary skill in the art are also within the scope of this invention. For instance, it will be apparent to one of ordinary skill in the art that various aspect and features of one of the above-described embodiments may be combined with another. Accordingly, the scope of the invention is intended to be defined only by the claims that follow.

What is claimed is:

1. An outboard motor comprising a power head and a drive shaft housing depending from the power head, the power head containing a four-cycle, internal combustion engine including at least one coolant passage, a cooling system running coolant through the coolant passage, an expansion chamber located in the drive shaft housing, an exhaust pipe depending below the engine and communicating with the expansion chamber to deliver exhaust gases to the expansion chamber, a lubricant tank for the engine disposed in the drive shaft housing above the expansion chamber and in proximity to the exhaust pipe, the lubricant tank including an upper portion and lower portion which is configured to pool lubricant for circulation in the engine, and a collection space formed between at least a portion of the exhaust pipe and the lower portion of the lubricant tank, the collection space communicating with the cooling system such that at least some coolant discharged from the engine coolant passage fills at least a portion of the collection space and pools about a portion of the lubricant tank, the lubricant tank being formed with an opening through which the exhaust pipe passes.

2. An outboard motor as set forth in claim 1, wherein the engine is mounted on an exhaust guide having an exhaust passage that receives exhaust gases from the engine, the upper portion of the lubricant tank and the exhaust pipe depending from an underside of the exhaust guide.

3. An outboard motor as set forth in claim 2 additionally comprising means for delivering exhaust gases from the engine to an idle exhaust gas discharge, which is formed on the drive shaft housing, through a path that extends above a level of lubricant in the lubricant tank.

4. An outboard motor as set forth in claim 3, wherein the means for delivering the exhaust gases from the engine to the idle exhaust gas discharge is formed at least in part by the exhaust guide.

5. An outboard motor as set forth in claim 1 additionally comprising an idle exhaust gas pathway communicating with an idle exhaust gas discharge independent of the exhaust pipe, the idle exhaust gas discharge being formed on the drive shaft housing.

6. An outboard motor as set forth in claim 5 additionally comprising an exhaust guide on which the engine is mounted, the exhaust guide including an exhaust passage, and the idle exhaust gas pathway communicates with the exhaust passage of the exhaust guide.

7. An outboard motor as set forth in claim 6, wherein at least a portion of the idle exhaust gas pathway is formed by a passage through the exhaust guide.

8. An outboard motor as set forth in claim 1 additionally comprising a closure plate covering an upper end of the expansion chamber and separating the collection space from the expansion chamber.

9. An outboard motor as set forth in claim 8, wherein the exhaust pipe extends through the closure plate and into the expansion chamber.

10. An outboard motor as set forth in claim 9 additionally comprising a seal positioned about the exhaust pipe and disposed between a portion of the exhaust pipe and a portion of the closure plate.

11. An outboard motor as set forth in claim 1, wherein the cooling system is an open-loop system that draws cooling water from and returns cooling water to a body of water in which the outboard motor is operated, and the cooling system returns the bulk of the cooling water from the engine back to the body of water through the collection space.

12. An outboard motor as set forth in claim 11, wherein the cooling system discharges cooling water to the body of water independently of the expansion chamber.

13. An outboard motor as set forth in claim 1 additionally comprising a closure plate that closes a lower end of the open area, which is defined on a lower side of the lubricant tank.

14. An outboard motor as set forth in claim 1 additionally comprising an exhaust spacer to which the exhaust pipe is attached, the exhaust spacer being positioned above the open area.

15. An outboard motor as set forth in claim 1, wherein at least a portion of the collection space is located beneath the lubricant tank.

16. An outboard motor as set forth in claim 1, wherein the collection space is in thermal communication with both the portion of the exhaust pipe and the lower portion of the lubricant tank.

17. An outboard motor as set forth in claim 16, wherein a periphery space is defined between at least the driveshaft housing and the lubricant tank, the collection space communicating with the periphery space through an effluent opening located at a lower end of the collection space.

18. An outboard motor as set forth in claim 1, wherein a portion of the open area defines the collection space.

19. An outboard motor as set forth in claim 18 additionally comprising an exhaust guide from which the lubricant tank depends, and the collection space being defined in part by an upstanding wall that lies to a side of the exhaust pipe and terminates at an upper edge located below the exhaust guide so as to define a spillway between the upper edge of the upstanding wall and a lower side of the exhaust guide.

20. An outboard motor as set forth in claim 19, wherein the upstanding wall and the lubricant tank form a unitary piece.

21. An outboard motor as set forth in claim 19, wherein the collection space communicates with a coolant drain passage through an effluent opening.

22. An outboard motor as set forth in claim 19 additionally comprising a spillover-coolant discharge pathway located within the drive shaft housing and communicating with the spillway.

23. An outboard motor as set forth in claim 22, wherein the spillover-coolant discharge pathway is defined in part by a dividing wall that extends between at least the drive shaft housing and the lubricant tank.

24. An outboard motor as set forth in claim 23, wherein the spillover-coolant discharge pathway is formed at least by the drive shaft housing, the upstanding wall, the dividing wall, the lubricant tank, and the expansion chamber.

25. An outboard motor as set forth in claim 22, wherein the collection space communicates with the spillover-coolant discharge pathway through a first effluent opening located at a lower end of the collection space.

26. An outboard motor comprising a power head and a drive shaft housing depending from the power head, the power head containing a four-cycle, internal combustion engine including at least one coolant passage, a cooling system running coolant through the coolant passage, an expansion chamber located in the drive shaft housing, an exhaust pipe depending below the engine and communicating with the expansion chamber to deliver exhaust gases to the expansion chamber, a lubricant tank for the engine disposed in the drive shaft housing above the expansion chamber and in proximity to the exhaust pipe, the lubricant tank including an upper portion and lower portion which is configured to pool lubricant for circulation in the engine, and a collection space formed between at least a portion of the exhaust pipe and the lower portion of the lubricant tank, the collection space communicating with the cooling system such that at least some coolant discharged from the engine coolant passage fills at least a portion of the collection space and pools about a portion of the lubricant tank an exhaust guide upon which the engine is mounted, the exhaust guide having an exhaust passage that receives exhaust gases from the engine, the upper portion of the lubricant tank and the exhaust pipe depending from an underside of the exhaust guide, and an exhaust spacer positioned between the exhaust guide and the exhaust pipe.

27. An outboard motor as set forth in claim 26, wherein the exhaust guide includes at least one coolant passage that extends through the exhaust guide, the exhaust spacer includes one or more cooling jackets that communicates with the coolant passage of the exhaust guide and at least one of the one or more cooling jackets of the exhaust spacer also communicate with the collection space.

28. An outboard motor as set forth in claim 27, wherein the collection space has a volume larger than a collective volume of the one or more cooling jackets of the exhaust spacer.

29. An outboard motor as set forth in claim 27, wherein the cooling jacket of the exhaust guide surrounds at least a portion of the exhaust passage through the exhaust guide.

30. An outboard motor comprising a power head and a drive shaft housing depending from the power head, the power head containing a four-cycle, internal combustion engine including at least one coolant passage, a cooling system running coolant through the coolant passage, an expansion chamber located in the drive shaft housing, an exhaust pipe depending below the engine and communicating with the expansion chamber to deliver exhaust gases to the expansion chamber, a lubricant tank for the engine disposed in the drive shaft housing above the expansion chamber and in proximity to the exhaust pipe, the lubricant tank including an open area through which the exhaust pipe passes, the lubricant tank also including an upper portion and lower portion which is configured to pool lubricant for circulation in the engine, and a collection space formed between at least a portion of the exhaust pipe and the lower portion of the lubricant tank, the collection space communicating with the cooling system such that at least some coolant discharged from the engine coolant passage fills at least a portion of the collection space and pools about a portion of the lubricant tank, and an exhaust spacer to which the exhaust pipe is attached, the exhaust spacer being positioned above the open area, wherein the exhaust spacer and the lubricant tank are unitarily formed.

31. An outboard motor comprising a power head and a drive shaft housing depending from the power head, the power head containing a four-cycle, internal combustion engine including at least one coolant passage, a cooling system running coolant through the coolant passage, an expansion chamber formed in the drive shaft housing, an exhaust pipe depending below the engine and communicating with the expansion chamber to deliver exhaust gases to the expansion chamber, a lubricant tank for the engine disposed in the drive shaft housing above the expansion chamber and in proximity to the exhaust pipe, the lubricant tank including an upper portion and a lower portion which is configured to pool lubricant for circulation in the engine, means for pooling at least some of the coolant discharged from the engine coolant passage within a space defined between at least a portion of the exhaust pipe and the lower portion of the lubricant tank, and a spillover-coolant discharge pathway located within the drive shaft housing and communicating with the means for pooling coolant.

32. An outboard motor as set forth in claim 31, wherein the engine is mounted on an exhaust guide having an exhaust passage that receives exhaust gases from the engine, and the lubricant tank and the exhaust pipe depend from an underside of the exhaust guide.

33. An outboard motor as set forth in claim 32 additionally comprising an exhaust spacer positioned between the exhaust guide and the exhaust pipe.

34. An outboard motor as set forth in claim 33, wherein the exhaust spacer includes one or more cooling jackets that communicates with a coolant passage through the exhaust guide, and the one or more cooling jackets of the exhaust spacer also communicate with the means for pooling coolant.

35. An outboard motor as set forth in claim 31, wherein the cooling system is an open-loop system that draws cooling water from and returns cooling water to a body of water in which the outboard motor is operated, the cooling system returns the bulk of the cooling water from the engine back to the body of water through the means for pooling coolant.

36. An outboard motor as set forth in claim 31, wherein the spillover-coolant discharge pathway is defined in part by a dividing wall that extends between at least the drive shaft housing and the lubricant tank.

37. An outboard motor as set forth in claim 31 additionally comprising an idle exhaust gas pathway communicating with an idle exhaust gas discharge independent of the exhaust pipe, the idle exhaust gas discharge being formed on the drive shaft housing.

38. An outboard motor as set forth in claim 37 additionally comprising an exhaust guide on which the engine is mounted, the exhaust guide including an exhaust passage, and the idle exhaust gas pathway communicates with the exhaust passage of the exhaust guide.

39. An outboard motor as set forth in claim 38, wherein at least a portion of the idle exhaust gas pathway is formed by a passage through the exhaust guide.

40. An outboard motor as set forth in claim 31, wherein the means for pooling coolant is in thermal communication with the portion of the exhaust pipe and the lower portion of the lubricant tank.

41. An outboard motor as set forth in claim 31, wherein a space is defined between at least the driveshaft housing and the lubricant tank, additionally comprising a spillway defined between the means for pooling coolant and the space.

42. An outboard motor comprising a power head and a drive shaft housing depending from the power head, the power head containing a four-cycle, internal combustion engine including at least one coolant passage, a cooling system running coolant through at least one coolant passage, an expansion chamber located in the drive shaft housing, an exhaust pipe depending below the engine and communicating with the expansion chamber to deliver exhaust gases to the expansion chamber, a lubricant tank for the engine disposed in the drive shaft housing above the expansion chamber and in proximity to the exhaust pipe, a collection space formed between at least a portion of the exhaust pipe and a portion of the lubricant tank, the collection space having a lower end positioned lower than a bottom end of the lubricant tank and communicating with the cooling system such that coolant discharged from the engine coolant passage fills at least a portion of the collection space, and an idle exhaust gas pathway communicating with an idle exhaust gas discharge independent of the exhaust pipe, the idle exhaust gas discharge being formed on the drive shaft housing.

43. An outboard motor as set forth in claim 42 additionally comprising an exhaust guide on which the engine is mounted, the exhaust guide including an exhaust passage, and the idle exhaust gas pathway communicating with the exhaust passage of the exhaust guide.

44. An outboard motor as set forth in claim 43, wherein at least a portion of the idle exhaust gas pathway is formed by a passage through the exhaust guide.

45. An outboard motor as set forth in claim 42, wherein the collection space is in thermal communication with both the portion of the exhaust pipe and the bottom end of the lubricant tank.

46. The outboard motor as set forth in claim 42, wherein the lubricant tank is formed with an open area through which the exhaust pipe passes.

47. An outboard motor as set forth in claim 46 additionally comprising a closure plate that closes a lower end of the open area, which is defined on a lower side of the lubricant tank.

48. An outboard motor as set forth in claim 46 additionally comprising an exhaust spacer to which the exhaust pipe is attached, the exhaust spacer being positioned above the open area.

49. An outboard motor as set forth in claim 48, wherein the exhaust spacer and the lubricant tank are unitarily formed.

50. An outboard motor as set forth in claim 46, wherein a portion of the open area defines the collection space.

51. An outboard motor comprising a power head and a drive shaft housing depending from the power head, the power head containing a four-cycle, internal combustion engine including at least one coolant passage, a cooling system running coolant through at least one coolant passage, an expansion chamber located in the drive shaft housing, an exhaust pipe depending below the engine and communicating with the expansion chamber to deliver exhaust gases to the expansion chamber, a lubricant tank for the engine disposed in the drive shaft housing above the expansion chamber and in proximity to the exhaust pipe, a collection space formed between at least a portion of the exhaust pipe and a portion of the lubricant tank, the collection space having a lower end positioned lower than a bottom end of the lubricant tank and communicating with the cooling system such that coolant fills at least a portion of the collection space, and an idle exhaust gas pathway communicating with an idle exhaust gas discharge independent of the exhaust pipe, the idle exhaust gas discharge being formed on the drive shaft housing, wherein the engine is mounted on an exhaust guide having an exhaust passage that receives exhaust gases from the engine, the lubricant tank and the exhaust pipe depend from an underside of the exhaust guide, and an exhaust spacer is positioned between the exhaust guide and the exhaust pipe.

52. An outboard motor as set forth in claim 51, wherein the exhaust spacer includes one or more cooling jackets that communicates with at least one coolant passage through the exhaust guide, and the one or more cooling jackets of the exhaust spacer also communicate with the collection space.

53. An outboard motor as set forth in claim 52, wherein the collection space has a volume larger than a collective volume of the one or more cooling jackets of the exhaust spacer.

54. An outboard motor as set forth in claim 52, wherein the cooling jacket of the exhaust guide surrounds at least a portion of the exhaust passage through the exhaust guide.

55. An outboard motor comprising a power head and a drive shaft housing depending from the power head, the power head containing a four-cycle, internal combustion engine including at least one coolant passage, a cooling system running coolant through at least one coolant passage, an expansion chamber located in the drive shaft housing, an exhaust pipe depending below the engine and communicating with the expansion chamber to deliver exhaust gases to the expansion chamber, a lubricant tank for the engine disposed in the drive shaft housing above the expansion chamber and in proximity to the exhaust pipe, the lubricant tank being formed with an open area through which the exhaust pipe passes, a collection space formed between at least a portion of the exhaust pipe and a portion of the lubricant tank, a portion of the opening defining a collection space having a lower end positioned lower than a bottom end of the lubricant tank and communicating with the cooling system such that coolant fills at least a portion of the collection space, and an idle exhaust gas pathway communicating with an idle exhaust gas discharge independent of the exhaust pipe, the idle exhaust gas discharge being formed on the drive shaft housing, and an exhaust guide from which the lubricant tank depends, the collection space being defined in part by an upstanding wall that lies to a side of the exhaust pipe and terminates at an upper edge located below the exhaust guide so as to define a spillway between the upper edge of the upstanding wall and a lower side of the exhaust guide.

56. An outboard motor as set forth in claim 55, wherein the upstanding wall and the lubricant tank form a unitary piece.

57. An outboard motor as set forth in claim 55, wherein the collection space communicates with a coolant drain passage through an effluent opening.

58. An outboard motor as set forth in claim 55 additionally comprising a spillover-coolant discharge pathway located within the drive shaft housing and communicating with the spillway.

59. An outboard motor as set forth in claim 58, wherein the spillover-coolant discharge pathway is defined in part by a dividing wall that extends between at least the drive shaft housing and the lubricant tank.

60. An outboard motor as set forth in claim 59, herein the spillover-coolant discharge pathway is formed at least by the drive shaft housing, the upstanding wall, the dividing wall, the lubricant tank, and the expansion chamber.

61. An outboard motor as set forth in claim 58, wherein the collection space communicates with the spillover-coolant discharge pathway through a first effluent opening located at a lower end of the collection space.

62. An outboard motor as set forth in claim 55, wherein a periphery space is defined between at least the driveshaft housing and the lubricant tank, the collection space communicating with the periphery space through an effluent opening located at a lower end of the collection space.

63. An outboard motor comprising a power head and a drive shaft housing depending from the power head, the power head containing a four-cycle, internal combustion engine including at least one coolant passage, a cooling system running coolant through at least one coolant passage, an expansion chamber formed in the drive shaft housing, an exhaust pipe depending below the engine and communicating with the expansion chamber to deliver exhaust gases to the expansion chamber, a lubricant tank for the engine disposed in the drive shaft housing above the expansion chamber and in proximity to the exhaust pipe, means for pooling coolant discharged from the engine coolant passage within a space defined between at least a portion of the exhaust pipe and a portion of the lubricant tank, the means for pooling coolant, at least in part, extending lower than a bottom end of the lubricant tank, the engine mounted on an exhaust guide having an exhaust passage that receives exhaust gases from the engine, the lubricant tank and the exhaust pipe depending from an underside of the exhaust guide, and an exhaust spacer positioned between the exhaust guide and the exhaust pipe.

64. An outboard motor as set forth in claim 63, wherein the exhaust spacer includes one or more cooling jackets that communicates with a coolant passage through the exhaust guide, and the one or more cooling jackets of the exhaust spacer also communicate with the means for pooling coolant.

65. An outboard motor as set forth in claim 63, wherein the means for pooling coolant is in thermal communication with both the portion of the exhaust pipe and the bottom end of the lubricant tank.

66. An outboard motor as set forth in claim 63, wherein a periphery space is defined between at least the driveshaft housing and the lubricant tank, additionally comprising a spillway defined between the means for pooling coolant and the periphery space.

67. An outboard motor comprising a power head and a drive shaft housing depending from the power head, the power head containing a four-cycle, internal combustion engine including at least one coolant passage, a cooling system running coolant through at least one coolant passage, an expansion chamber formed in the drive shaft housing, an exhaust pipe depending below the engine and communicating with the expansion chamber to deliver exhaust gases to the expansion chamber, a lubricant tank for the engine disposed in the drive shaft housing above the expansion chamber and in proximity to the exhaust pipe, means for pooling coolant within a space defined between at least a portion of the exhaust pipe and a portion of the lubricant tank, the means for pooling coolant, at least in part, extending lower than a bottom end of the lubricant tank, the engine mounted on an exhaust guide having an exhaust passage that receives exhaust gases from the engine, the lubricant tank and the exhaust pipe depending from an underside of the exhaust guide, and an exhaust spacer positioned between the exhaust guide and the exhaust pipe, and a spillover-coolant discharge pathway located within the drive shaft housing and communicating with the means for pooling coolant.

68. An outboard motor as set forth in claim 67, wherein the spillover-coolant discharge pathway is defined in part by a dividing wall that extends between at least the drive shaft housing and the lubricant tank.

69. An outboard motor comprising a power head and a drive shaft housing depending from the power head, the power head containing a four-cycle, internal combustion engine including at least one coolant passage, a cooling system running coolant through at least one coolant passage, an expansion chamber formed in the drive shaft housing, an exhaust pipe depending below the engine and communicating with the expansion chamber to deliver exhaust gases to the expansion chamber, a lubricant tank for the engine disposed in the drive shaft housing above the expansion chamber and in proximity to the exhaust pipe, means for pooling coolant within a space defined between at least a portion of the exhaust pipe and a portion of the lubricant tank, the means for pooling coolant, at least in part, extending lower than a bottom end of the lubricant tank, the engine mounted on an exhaust guide having an exhaust passage that receives exhaust gases from the engine, the lubricant tank and the exhaust pipe depending from an underside of the exhaust guide, and an exhaust spacer positioned between the exhaust guide and the exhaust pipe, and an idle exhaust gas pathway communicating with an idle exhaust gas discharge independent of the exhaust pipe, the idle exhaust gas discharge being formed on the drive shaft housing.

70. An outboard motor as set forth in claim 69 additionally comprising an exhaust guide on which the engine is mounted, the exhaust guide including an exhaust passage, and the idle exhaust gas pathway communicates with the exhaust passage of the exhaust guide.

71. An outboard motor as set forth in claim 70, wherein at least a portion of the idle exhaust gas pathway is formed by a passage through the exhaust guide.

\* \* \* \* \*